April 9, 1957  L. S. GREENLAND ET AL  2,788,185
FEEL SIMULATOR RESPONSIVE TO SPEED ONLY WHEN
WITHIN SELECTED MACH NUMBERS
Filed Sept. 27, 1954  2 Sheets-Sheet 1

Inventors
Leonard Sidney Greenland,
Roy Westbury and
Charles Philip Smith
By Moses, Nolte, Crier & Berry
Attorneys April 9, 1957  L. S. GREENLAND ET AL  2,788,185
FEEL SIMULATOR RESPONSIVE TO SPEED ONLY WHEN
WITHIN SELECTED MACH NUMBERS
Filed Sept. 27, 1954  2 Sheets-Sheet 2

United States Patent Office 2,788,185
Patented Apr. 9, 1957

2,788,185

FEEL SIMULATOR RESPONSIVE TO SPEED ONLY WHEN WITHIN SELECTED MACH NUMBERS

Leonard Sidney Greenland, Wolverhampton, and Roy Westbury, Bridgnorth, Salop, England, and Charles Philip Smith, Ramsey, Isle of Man, assignors to H. M. Hobson Limited, London, England, a company of Great Britain Application September 27, 1954, Serial No. 458,334

Claims priority, application Great Britain September 29, 1953

9 Claims. (Cl. 244—83)

In aircraft fitted with power-operated control surfaces, or in which the control surfaces are operated by servo tabs, the aerodynamic loads on the control surfaces are not felt by the pilot, and it is known to provide the pilot with a feel simulator which will impose on his control member loads representative of the aerodynamic loading on the control surfaces.

In United States application Serial No. 407,536 we have described a hydraulic feel simulator in which movement of the piston linked to the pilot's control member is opposed by a hydraulic pressure which is increased progressively as the airspeed increases.

The object of the present invention is to provide a feel simulator in which the force opposing movement of the pilot's control member, while increasing progressively with the airspeed under normal conditions, exhibits a sudden discontinuity when a predetermined Mach number is reached.

The relationship between the hinge moment of an aircraft control surface and its angular position in relation to the aircraft varies both with the airspeed and altitude of the aircraft. The control surface angle required to produce a manoeuvre or an acceleration expressed as a given value of $g$, where $g$ is the value given to the acceleration due to gravity, therefore also varies with speed and altitude. Generally speaking, the object of a feel simulator is to maintain a constant value of stick force per $g$ irrespective of all other effects.

Subsonically this is approximately fulfilled if the control pressure in the housing is varied in direct proportion to $q$ (the difference between static atmospheric pressure and the total pressure derived from the forward speed of the aircraft), as described in United States application No. 407,536/54. It is however known that at speeds approaching and exceeding sonic speeds the normal increase of control surface hinge moment with speed is interrupted, and that the resistance imposed by the feel simulator to movement of the pilot's control member should be modified accordingly.

Figure 1:
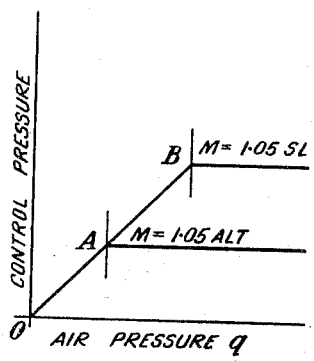
Figure 2:
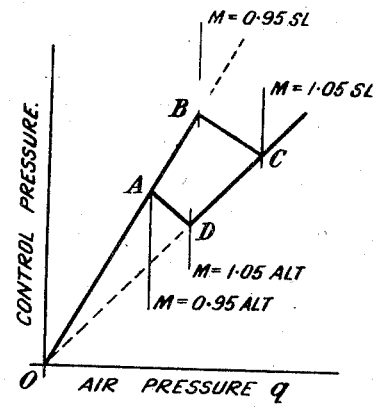

Typical requirements are shown in Figs. 1 and 2 of the accompanying drawings, in which control pressures (i. e. the hydraulic pressures opposing movement of the pilot's control member) are plotted as ordinates and air pressures $q$ as abscissae. From these it will be seen that the control pressure is to be dependent on Mach number as well as on speed and altitude.

In each figure the curve OAB represents the normal relationship between control pressure and air pressure $q$ which requires modification at high Mach numbers. The curve OAB is shown in each case as a straight line. It would, however, be a curved line if the control mechanism were so modified, as described in United States application Serial No. 407,536/54, that the control pressure is proportional to a power of the airspeed V other than $V^2$.

In Fig. 1 the requirement is that, at a Mach number of 1.05, the control pressure should remain constant notwithstanding continued increase in air pressure $q$, this effect occurring at the point B at sea level and at the point A at altitude.

In Fig. 2 the requirement is that with a Mach number of 0.95 (point B at sea level and point A at altitude) the control pressure should decrease with increase of air pressure $q$, as indicated by the lines BC, AD, until a selected higher Mach number of 1.05 is reached, whereafter the control pressure again increases progressively with air pressure $q$ but at a rate defined by the line DC.

With a view to meeting these requirements the invention provides a modification of the feel simulator described and claimed in United States application Serial No. 407,536/54 comprising a normally inoperative device responsive to Mach number arranged, when a selected Mach number is exceeded, to apply to the pressure-regulating valve a force acting in opposition to that exerted thereon by the device responsive to airspeed.

Various specific embodiments of the invention will now be described in detail, by way of example, with reference to Figs. 3–6 of the accompanying drawings.

Figure 5:
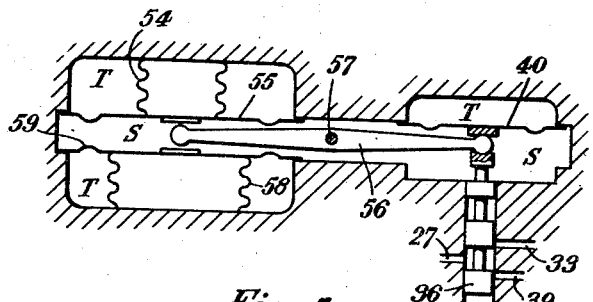
Figure 6:
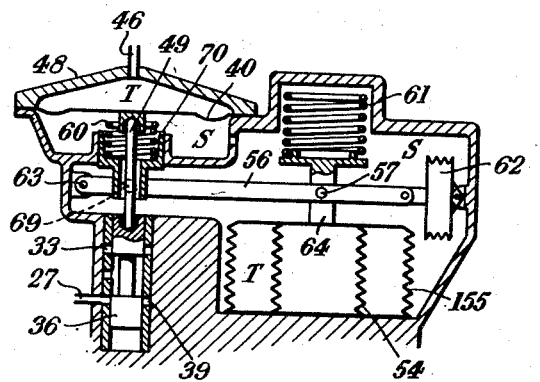
Figure 3:
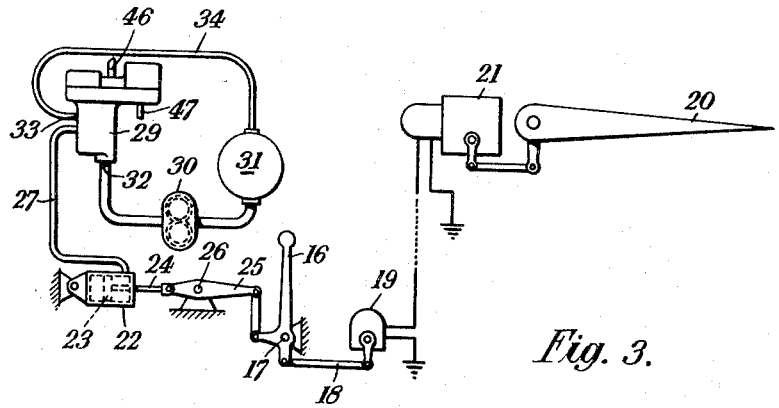
Figure 4:
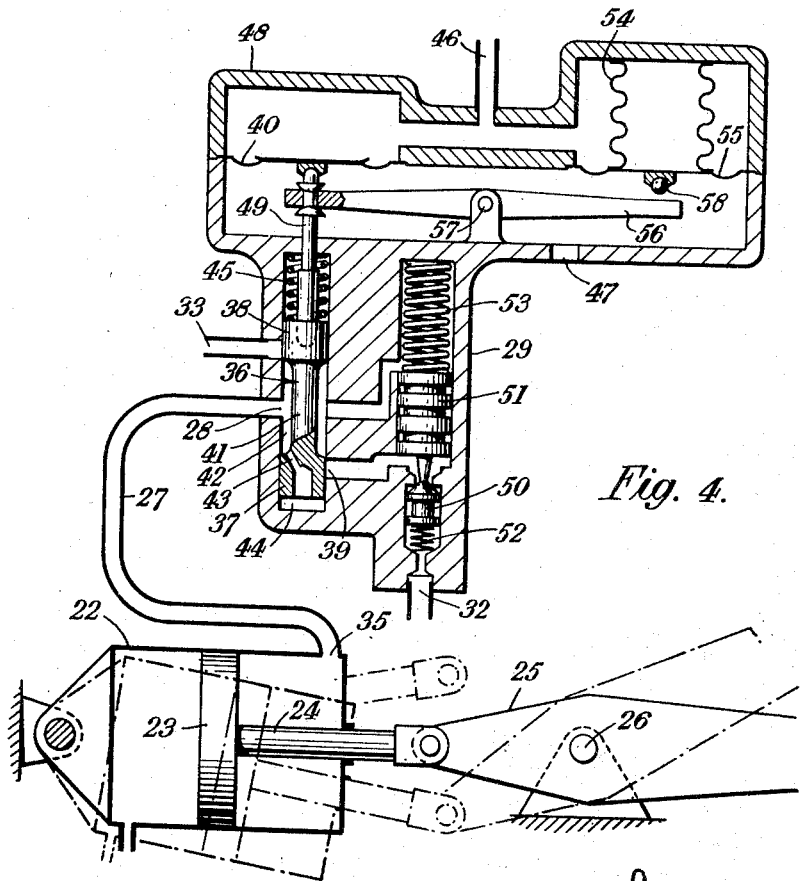

In the drawings:

Figs. 1 and 2 are the diagrams to which reference has already been made indicating typical requirements to be met by the feel simulator according to the invention, Fig. 3 is a diagram showing a typical installation according to the invention, Fig. 4 is a longitudinal sectional view of the feel simulator indicated in Fig. 3, and Figs. 5 and 6 are diagrams showing two modified constructions of feel simulator.

Fig. 3 shows diagrammatically a pilot's control member 16, pivoted at 17, and coupled by a connection 18 to the transmitter 19 of a servo mechanism for actuating the control surface 20 of an aircraft, the receiver of the servo mechanism being indicated at 21. As will be well understood the servo mechanism 19, 21 serves to displace the control surface 20 in a direction and to an extent determined by the movement of the control member 16 from a neutral position.

The feel simulator comprises a hydraulic cylinder 22 (see also Fig. 4) containing a piston 23, the piston rod 24 being connected to the control member 16 by a lever 25, pivoted intermediately at 26 and pivoted at its ends to the control member and to the piston rod respectively. Movement of the control member 16 in either direction away from its neutral position will draw the piston 23 to the right (as seen in Fig. 4) to expel liquid from the cylinder 22 through an outlet 35, connected by a conduit 27 to a port 28 in a unit 29, which determines the hydraulic pressure prevailing in the cylinder 22, herein referred to as the control pressure. A pump 30 (Fig. 3) drawing liquid from a reservoir 31, supplies liquid under pressure to the inlet 32 of the unit 29, which has an exhaust outlet 33 communicating, via a conduit 34, with the reservoir 31.

As will be apparent from Fig. 4, the lever 25 works at a progressively decreasing mechanical advantage as the control member 16 is moved away from its neutral position. Consequently the hydraulic resistance to movement of the control member 16, and therefore the feel imparted by the feel generator, increase with displacement of the control member. The feel is also varied in accordance with changes in airspeed by the unit 29 as will now be described.

The unit 29 contains a piston type control valve 36 (Fig. 4) for determining the control pressure prevailing in the cylinder 22. The valve 36 has lands 37, 38 coacting respectively with a pressure port 39 and the exhaust outlet 33. It also has a waisted portion 41, and the space 42 surrounding the waisted portion communicates with the port 28 and therefore with the cylinder 22. A passage 43 connects the space 44 beneath the valve with the space 42, and the valve 36 is thus subjected at its lower end to the control pressure. It is normally held balanced in the neutral position shown in Fig. 4 by the pressure of a spring 45, assisted by the downward pressure of a diaphragm 40 which bears against the end of an extension 49 of the valve 36. The upper surface of the diaphragm 40 is subject to total pressure applied to an inlet 46 and the undersurface of the diaphragm is subjected to static air pressure through an inlet 47.

The unit 29 has an inlet valve 50 and a pressure differential valve 51, which effect a first stage reduction in the pressure, this reduced pressure being applied to the port 39, and the control valve 36 effects a second stage reduction in the pressure before it is applied to the piston 23. The inlet valve 50 is normally held closed by a spring 52. The pressure differential valve 51 is subjected at its undersurface to the pressure at the inlet port 39 and at its upper surface to the control pressure and to the pressure of a spring 53. It acts to maintain at the inlet port 39 a reduced pressure at a value exceeding the value of the control pressure by a predetermined amount determined by the load of the spring 53. When the control valve 36 moves down, to connect the port 28 to the inlet port 39, liquid will flow into the conduit 27 to increase the control pressure. At the same time, the resulting fall of pressure beneath the valve 51 will cause the latter to move down to open the inlet valve 50 and allow liquid at high pressure to pass from the inlet 32 to the port 39. The valve 51 returns to the position shown, allowing the inlet valve 50 to close, as soon as the pressure at the inlet 39 again exceeds the control pressure by the predetermined amount. When the the valve 36 moves to reduce the control pressure, the pressure at the inlet port 39 gradually falls to the predetermined excess value by leakage of liquid past the valves 36, 51. The first stage pressure reduction is only necessary in the case when a high inlet pressure is applied to the inlet 32. As will be apparent, movement of the piston 23 to the right, as seen in Fig. 4, causes the valve 36 to lift, allowing the piston 23 to displace liquid from the cylinder 22 to the exhaust outlet 33. When the pilot's control member is returned to its neutral position, the piston 23 moves to the left, and the valve 36 descends allowing liquid to flow from the pressure port 39 into the cylinder 22 until the control pressure has returned to a value sufficient to restore the valve 36 to its neutral position.

The diaphragm 40 and the valve 37 will normally produce in the cylinder 22 a control pressure which is proportional to the pressure difference across the diaphragm 40 as shown by the line OAB in Fig. 1.

Situated in the same casing 48 as the diaphragm 40 is a device responsive to Mach number and comprising an evacuated bellows 54 and associated diaphragm 55, to the upper surface of which total pressure is applied through the inlet 46 and to the undersurface of which static air pressure is applied through the inlet 47.

The areas of the bellows 54 and the diaphragm 55, A54 and A55 respectively, are such that the ratio $$\frac{A55}{A55-A54}$$

is equal to the pressure ratio between total and static pressures at the selected Mach number, i. e. that at which it is desired to change the slope of the curve of Fig. 1. At Mach numbers less than the selected value, the balance of forces acting on the bellows 54 and diaphragm 55 will be such that the bellows and diaphragm are retracted and do not contact a lever 56. The lever 56 is pivoted intermediately at 57 and its left hand end engages the extension 49 of the valve 36. Above the selected Mach number, a stop 58 on the undersurface of the diaphragm 55 will contact the right hand end of the lever 56, so tending to rock the lever 56 clockwise and so to lift the valve 36, thereby reducing the control pressure in the cylinder 22.

Accordingly, on further increase of speed and/or Mach number the slope of the curve, shown in Fig. 1, relating control pressure and air pressure $q$, will be determined by the relative areas of the diaphragms 40 and 55. By suitable choice of these areas, taking into account the lever arm ratio of the lever 56, we can arrange that, above the selected Mach number, the increase in total pressure T, which acts on the diaphragms 40 and 55 as the airspeed increases, will produce no increase in control pressure as shown in Fig. 1. Obviously, by variation in the relative areas of the two diaphragms, we can arrange for the portion of the curve beyond the selected Mach number to lie above or below the horizontal indicated in Fig. 1. The point at which the slope of the curve changes will be determined purely by Mach number and will occur at an air speed and a corresponding air pressure which will depend upon altitude.

Fig. 5 shows diagrammatically an apparatus for achieving the requirements of Fig. 2. It is similar in principle to that shown in Fig. 4, the spaces subject to total pressure being marked T and those subject to static air pressure marked S. It differs from the apparatus of Fig. 4 in that the spring 45 (Fig. 4) loading the valve 36 is omitted and in that it includes a further device responsive to Mach number and comprising an evacuated bellows 58 and an associated diaphragm 59. The point of departure from the basic curve Fig. 2 is determined as before by the ratio $$\frac{A55}{A55-A54}$$

where A54 and A55 are respectively the areas of the bellows 54 and the diaphragm 55. Above the selected Mach number (0.95 in Fig. 2) the bellows 54 and the diaphragm 55 will be in contact with the lever 56. The slope of the curve BC of Fig. 2 is controlled by the ratio of the effective areas of the diaphragms 40 and 55. The downward trend shown is produced by making the effective area of the diaphragm 55 greater than that of the diaphragm 40.

At another higher selected Mach number (1.05 in Fig. 2) the bellows 58 and the diaphragm 59 will extend and come into contact with the lever 56, and from this point onwards the slope of the curve is determined by the effective areas of the diaphragms 40, 55 and 59, all of which are subject to total pressure T.

Fig. 6 shows diagrammatically a further apparatus for achieving the requirement of Fig. 2. It is similar to that of Fig. 4 with the exception of the addition of two springs 60, 61, and a compensating bellows 62, and the fact that the diaphragm 55 of the device responsive to Mach number is replaced by a bellows 155, the pivot point 57 of the lever 56 is on a member 64 attached to the bellows 54, 155, and the lever 56 is pivoted at 69 to a movable support 70 for the lower end of the spring 60, and the lever 56 is pivoted at 63 to the casing 48. As in Fig. 5 spaces subject to total pressure are marked T and those subject to static air pressure are marked S.

Below the lower selected Mach number, the spring 60 is ineffective, the diaphragm 40 acting directly on the extension 49 of the valve 36. When the lower selected Mach number is reached, the bellows 54, 155 move up, rocking the lever 56 counterclockwise about its pivot 63 to bring the spring 60 into contact with the diaphragm 40. Above the lower selected Mach number, therefore, the slope of the curve indicated in Fig. 2 is determined by the ratio of the effective areas of the diaphragm 40 and the bellows 155. This statement ignores the mechanical spring rate of the bellows 54 and 155 and assumes that all of the force generated is transmitted via the spring 60. In practice the spring rate of the bellows 54 and 155 will cancel some proportion of the force generated by the pressures on these bellows, and due allowance must be made for this by slight increase of area of the bellows. Between the lower and upper selected Mach numbers (points B and C on Fig. 2) the bellows 54 and 155 will progressively extend, until, at point C, the spring 61 comes into contact with the casing 48. According to the rate of spring 61, the proportion of the forces derived from further increase of pressure in the bellows 155 will be re-acted by the casing 48, instead of by the diaphragm 40 via the spring 60. Therefore the slope of the curve beyond the point C in Fig. 2 will again be tilted upwards. The actual slope depends on the rate of the spring 61.

The slope of the line OAB in Fig. 2 is thus determined by the areas of the diaphragm 40 and control valve 36 (Fig. 6), the slope of the line BC is determined by the modifying effect of the bellows 54, 155 imposed on the diaphragm 40 through the spring 60 and the slope of the line ODC by the further modification introduced by the restraining effect of the spring 61. If the spring 61 were dispensed with, the relation between control pressure and air pressure would continue along the line BC beyond the point C. If the spring 61 were replaced by a fixed abutment, the line DC would be parallel to the line AB. The points A and B are determined by Mach number, i. e. by the relative areas of the bellows 54, 155.

Since, for a given altitude, only total pressure T changes with increase of Mach number, the interval between points B and C in Fig. 2 will be determined by air speed, rather than by Mach number. For instance, at high altitudes the change of total pressure T for a given range of Mach number is a small percentage of the sea level change of total pressure T for a similar range of Mach number.

Thus in the absence of any special provision, the band between the lower and upper selected Mach numbers tends to increase with increasing altitude. This effect is obviated by the bellows 62 which is evacuated and subjected externally to static pressure S. It will be seen that as altitude decreases the bellows 62 will apply a tension force to the lever 56. This has the effect of artificially stiffening the spring load of the bellows 54 and 155 as altitude decreases. By suitable proportioning of the linkage and the area of the bellows 62 it can be arranged that the band between the lower and upper selected Mach number is constant at all altitudes.

One of the difficulties with the multi-capsule arrangements shown in Figs. 4, 5 and 6 is that the spring rate when all of the bellows and diaphragms are in operation above the point C, Fig. 2, may be excessive. This results in large pressure losses through the valve 36 as the control column is displaced. In the arrangement of Fig. 6, this can be overcome by giving the evacuated bellows 62 a pre-load such that it exerts a compression force on the lever 56, the value of the compression force being progressively reduced as altitude is decreased. This compression force produces a hinge moment on the lever 56 which tends to cancel the effect of the bellows 54 and 155. Thus by giving the bellows 62 a pre-load, the spring rate of bellows 54 and 155 is artificially decreased, the extent of the decrease being modified at altitude.

The bellows 62 can therefore act to maintain the band between the lower and upper selected Mach numbers constant at all altitudes either by exerting on the bellows 54 and 155 a stiffening effect which increases with decreasing altitude or a de-stiffening effect which increases with increasing altitude.

It will be appreciated that the bellows 155 of Fig. 6 can be replaced by a diaphragm, as in the case of Fig. 4. It is also immaterial whether the evacuated bellows 54 is inside the bellows 155 as shown in Fig. 6, or whether the bellows 155 is disposed inside the evacuated bellows 54. The choice depends largely on the desired effective areas of the bellows and on ease of manufacture.

What we claim as our invention and desire to secure by Letters Patent is:

1. A feel simulator for use in aircraft comprising, in combination with a pilot's control member, a housing, a piston in the housing subject to hydraulic pressure, a pressure-reducing valve which determines the hydraulic pressure prevailing in the housing, a linkage actuable by the control member to effect relative movement of the piston and housing, the linkage being such that the resistance opposing movement of the control member increases progressively with displacement of the control member in either direction from a neutral position, a device responsive to air speed which coacts with the pressure-reducing valve by applying thereto, below a selected Mach number, a force which varies with changes in airspeed, to establish in the housing a hydraulic pressure which increases and decreases in response to increase and decrease in airspeed, and a normally ineffective device responsive to Mach number arranged, when the selected Mach number is exceeded, to apply to the pressure-regulating valve a force opposing that exerted thereon by the device responsive to airspeed.

2. A feel simulator according to claim 1, comprising a lever operatively connected at one end to the pressure-regulating valve and pivoted intermediately of its length, the device responsive to Mach number being arranged to contact the free end of the lever when the selected Mach number is attained and to exert the opposing force on the valve through the agency of said lever when the selected Mach number is exceeded.

3. A feel simulator according to claim 1, comprising a further device responsive to Mach number and arranged, when a higher selected Mach number is obtained, to apply to the pressure-regulating valve a force opposing that exerted by the first device responsive to Mach number.

4. A feel simulator for use in aircraft comprising, in combination with a pilot's control member, a device coupled to said control member and exerting thereon a force opposing movement of said control member from a neutral position, means responsive to air speed which coacts with said device below a selected Mach number to increase said opposing force as the airspeed increases, and a normally ineffective device responsive to Mach number operative, when said selected Mach number is exceeded, to reduce the rate of increase with airspeed of said opposing force.

5. A hydraulic feel simulator for use in aircraft comprising, in combination with a pilot's control member, a housing having an outlet for liquid, a valve movable to connect said outlet alternatively to pressure and exhaust and thereby to modify the hydraulic pressure in said housing, means for subjecting said valve to the hydraulic pressure prevailing in said housing, a device responsive to airspeed exerting an opposing force on said valve, said valve being movable under control of said airspeed responsive device to maintain in said housing below a selected Mach number a hydraulic pressure which increases and decreases in response respectively to increase and decrease in airspeed, a normally ineffective device responsive to Mach number arranged, when the selected Mach number is exceeded, to apply to said valve a force opposing the force exerted thereon by the airspeed responsive device, a piston movable in said housing and a linkage actuable by said control member to effect relative movement of said piston and housing against the hydraulic pressure in the housing.

6. A hydraulic feel simulator for use in aircraft comprising, in combination with a pilot's control member, a housing having an outlet for liquid, a valve movable to connect said outlet alternatively to pressure and exhaust and thereby to modify the hydraulic pressure in said housing, means for subjecting said valve to the hydraulic pressure prevailing in said housing, a pressure-sensitive device subject at one side to total pressure and at the other to static air pressure, an extension of said valve bearing against said pressure-sensitive device to enable said device to operate said valve to maintain in said housing below a selected Mach number a hydraulic pressure which increases and decreases in response respectively to increase and decrease in airspeed, a normally ineffective spring, a pivoted lever, a normally ineffective device responsive to Mach number bearing against said lever and arranged, when the selected Mach number is attained, to render said spring operative on the pressure-sensitive device to exert thereon, in response to further increase in Mach number, a force opposing that exerted by the pressure-sensitive device on the valve, a piston movable in said housing and a linkage actuable by said control member to effect relative movement of said piston and housing against the hydraulic pressure in the housing.

7. A feel simulator according to claim 6, comprising a normally ineffective further spring arranged to become operative on the lever when a higher selected Mach number is attained and thereafter to relieve the pressure-sensitive device of part of the force exerted thereon by the first spring.

8. A feel simulator according to claim 7, wherein the pivot of said lever is at one end thereof and comprising an evacuated bellows subject externally to static air pressure and connected between the other end of said lever and a fixed anchorage point, said bellows executing a tension force on said lever.

9. A feel simulator according to claim 7, wherein the pivot of said lever is at one end thereof and comprising an evacuated bellows subject externally to static air pressure and connected between the other end of said lever and a fixed anchorage point, said bellows being preloaded to exert on said lever a compression force which is diminished progressively in response to increase in altitude.

References Cited in the file of this patent

UNITED STATES PATENTS

| | | |
|---|---|---|
| 2,140,037 | Swisher | Dec. 13, 1928 |
| 2,445,343 | Tyra | July 20, 1948 |
| 2,548,481 | Knowler et al. | Apr. 10, 1951 |
| 2,638,289 | McKellar et al. | May 12, 1953 |

FOREIGN PATENTS

| | | |
|---|---|---|
| 321,851 | Great Britain | Oct. 2, 1929 |